US006206107B1

(12) United States Patent
Wadge

(10) Patent No.: US 6,206,107 B1
(45) **Date of Patent: *Mar. 27, 2001**

(54) POWER TOOL

(75) Inventor: Brian Wadge, Spennymoor (GB)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,231

(22) Filed: Jun. 26, 2000

(30) Foreign Application Priority Data

Oct. 1, 1997 (GB) .................................................. 9720721

(51) Int. Cl.[7] ...................................................... B23B 45/02

(52) U.S. Cl. ............................ 173/217; 173/29; 173/170; 310/50

(58) Field of Search .................................... 173/217, 216, 173/29, 170; 451/461; 310/47, 50; 408/20; 464/177, 901; 429/97

(56) References Cited

U.S. PATENT DOCUMENTS

| | | | |
|---|---|---|---|
| 1,965,669 | 7/1934 | Robb | 310/50 |
| 2,430,422 * | 11/1947 | Happe | 173/217 |
| 2,808,085 * | 10/1957 | Hollien et al. | 408/20 |
| 3,056,439 * | 10/1962 | Hall et al. | 408/20 |
| 3,724,237 * | 4/1973 | Wood | 173/29 |
| 3,759,336 * | 9/1973 | Marcovitz et al. | 173/170 |
| 4,050,003 * | 9/1977 | Owings et al. | 310/50 |
| 4,103,511 | 8/1978 | Kress et al. | 464/177 |
| 4,871,629 * | 10/1989 | Bunyea | 429/97 |
| 4,962,681 * | 10/1990 | Yang | 408/20 |
| 5,033,552 * | 7/1991 | Hu | 173/170 |
| 5,336,953 * | 8/1994 | Allemann | 173/217 |
| 5,624,000 * | 4/1997 | Miller | 173/217 |

FOREIGN PATENT DOCUMENTS

| | | |
|---|---|---|
| 643 674 | 5/1964 | (BE) . |
| 1902315 | 10/1964 | (DE) . |

* cited by examiner

*Primary Examiner*—Peter Vo
*Assistant Examiner*—Jim Calve
(74) *Attorney, Agent, or Firm*—Bruce S. Shapiro

(57) ABSTRACT

A power tool (10) includes a motor (22) mounted there within. The motor has an output (20) for engagement with an input of an attachment member (32) presented thereto. The coupling between the motor output (20) and the attachment member (32) is by a snap-fit coupling achieved by way of resiliently biased arms (56) within the tool engaging with an annular recess (54) formed on the attachment member (32).

24 Claims, 7 Drawing Sheets

POWER TOOL

BACKGROUND OF THE INVENTION

1. Field of the Invention

The present invention relates to a power tool and has particular although not exclusive, relevance to battery powered tools.

2. Description of the Related Art

It is conventional for power tools to be designed and built for a dedicated purpose, such as a drill, a jigsaw or a sander. If the user needs to undertake a sanding operation he will use a dedicated sander. If then he needs to drill a hole in a workpiece he will swap the sander for a dedicated drill, and so on.

Whilst such swapping over of dedicated tools is not inconvenient, it does mean that, particularly for the person who needs to use power tools relatively infrequently, considerable expense is incurred in acquiring a broad range of these dedicated power tools.

Furthermore, in the case of so-called "cordless" or battery-powered tools, the user will either need to change the battery pack when changing dedicated tools, or have several ready-charged batteries available for use. These alternative options are cumbersome or expensive respectively.

Solutions to the above problems have been proposed in the past and one such solution entails providing a power tool including a motorized drive which is capable of accepting any one of a plurality of discrete attachments which achieve a dedicated purpose. This means that rather than purchasing a dedicated entire power tool for each job, the user only has to purchase a dedicated attachment (which is cheaper than a dedicated entire tool) and just swap these over as and when necessary. Even with such a proposed solution problems still exist, however. It has been found that the user perceives as either problematic or irritating the fact that interchanging such discrete attachments can take some time. Very often the user needs to ensure accurate mating of the connecting parts and this may also entail manually connecting the individual component parts by, for example, a nut and bolt connection.

BRIEF SUMMARY OF THE INVENTION

It is thus an object of the present invention to at least alleviate the aforementioned shortcomings by provision of a power tool whereby discrete attachments may be readily and easily coupled and decoupled from the body of the tool without the need for a separate manual connection operation, such as the one described above, by the user of the tool.

Accordingly the present invention provides a power tool including a body portion defining a handle and a motor mounted within the body portion, which motor is arranged to drive an output spindle of the tool; the body portion further defining an opening around the output spindle, which opening accepts any one of a plurality of attachment members presented thereto, the power tool characterized in that the body portion includes, within the opening, first engagement means for selective engagement with co-operable second engagement means formed on or from an attachment member. Thus by provision of the means for coupling the body portion to the attachment member on the members themselves, the need for a separate connection means is avoided.

Preferably the first engagement means is biased so as to be urged into engagement with the co-operable second engagement means in its rest position. This provides that once the co-operable second engagement means is in position, it will remain there and be restrained by the first engagement means.

In a preferred embodiment the first engagement means is spring biased into its rest position. Additionally it is possible that the first engagement means comprises a plurality of arms.

Advantageously the co-operable second engagement means, when presented to the first engagement means is held in rigid engagement with the body portion by the first engagement means. This means that the power tool is then automatically in a state of readiness to be used.

Preferably the co-operable second engagement means includes a projecting member which, when the co-operable second engagement means is presented to the first engagement means, acts against the biasing of the first engagement means thereby to enable coupling of the co-operable second engagement means with the first engagement means. This enables the co-operable engagement member to couple with the first engagement means without the need for manual displacement of the first engagement means.

Preferably the coupling between the co-operable second engagement means and the first engagement means is a snap-fit coupling. This ensures that the body portion and the attachment member are definitely in correct engagement in order for the user to be able to start to use the tool.

Advantageously the co-operable second engagement means includes a recess for coupling with the first engagement means. This provides for ease of coupling. Additionally the recess may be an annular recess.

Preferably the projecting member is arranged as a tapered leading edge of the co-operable second engagement means.

Advantageously the first engagement means includes a manually operable release member to release the selective engagement between the first engagement means and the co-operable second engagement means. This allows the user to readily separate the attachment member portion from the body. Preferably the release member acts against the biasing of the first engagement means. It is also desirable that the release member acts to cause the arms to move.

BRIEF DESCRIPTION OF THE DRAWINGS

The present invention will now be described, by way of example only and with reference to the accompanying drawings, of which.

DESCRIPTION OF THE PREFERRED EMBODIMENT

Figure 1:
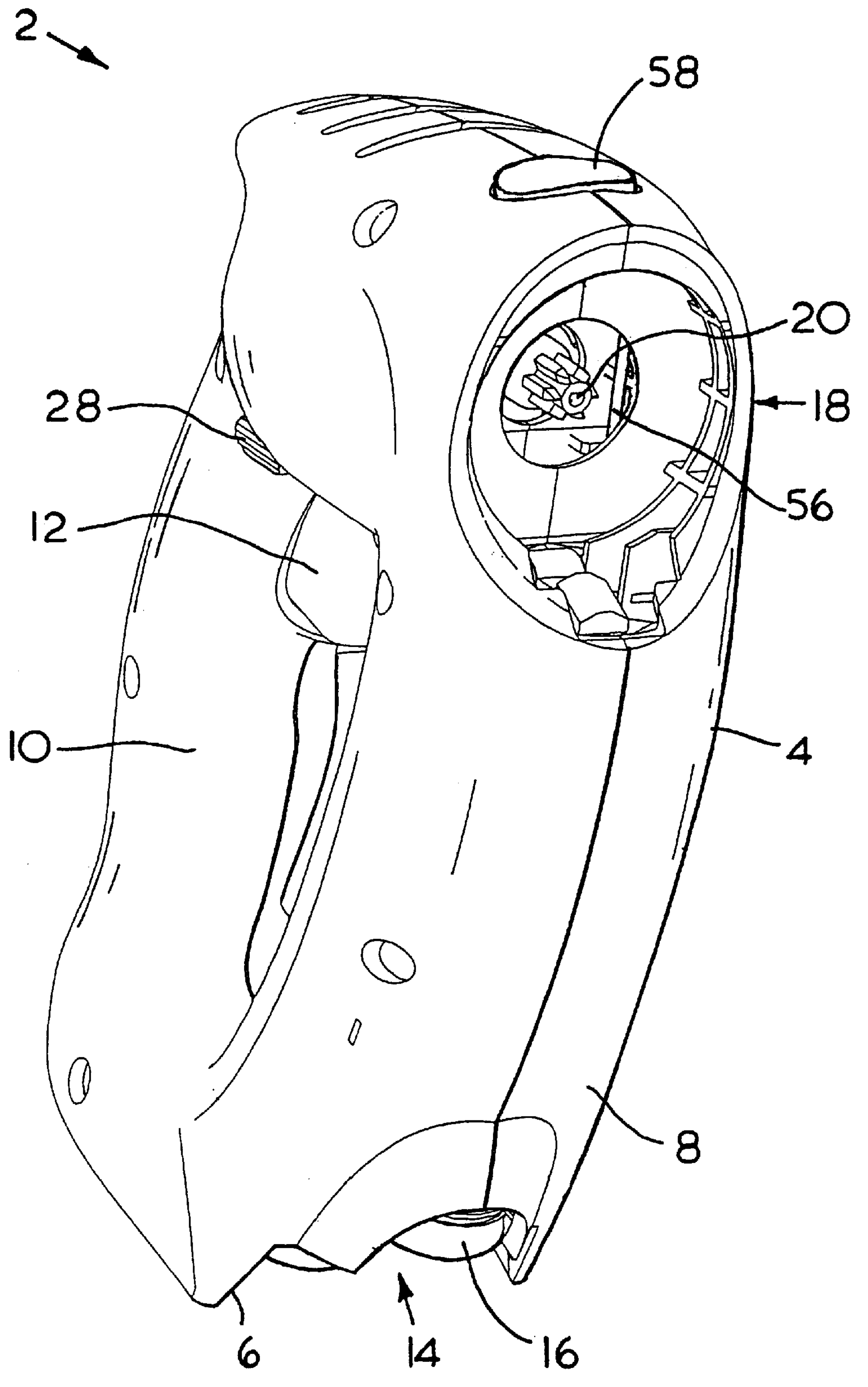
FIG. 1 shows a front perspective view of a body portion of a power tool in accordance with the present invention.

By referring firstly to FIG. 1, a power tool shown generally as (2) includes a body portion (4) formed from two halves of a plastics clamshell. The two halves (6,8) co-operatively engage together to encapsulate the internal mechanisms of the power tool, which will be described here below. The body portion (4) defines a handle (10) which in use of the tool (2) is grasped by the user. The handle (10) is shaped so as to provide the user with easy access to an actuating switch means (12) in the form of a pistol grip, which is conventional in the art of power tools. The body portion (4) is formed from the two halves of clamshell (6,8) also to define an opening shown generally as (14), through which batteries (16) for powering the tool may pass. Those skilled in the art will appreciate that the choice of batteries for powering the tool (2) depends upon the work which the tool is required to undertake. The batteries per se form no part of the present invention and so will not be described in any more detail herein.

At the opposite end of the body portion (4) from the battery opening (14) the two halves of the clamshell (6,8) define an opening (18) through which an output spindle (20) of a motor (22) housed within the body portion (4) (and shown in more detail in FIG. 2) is mounted.

By referring now also to FIGS. 2 and 3, the internal mechanism of the tool (2) will be described in more detail.

Figure 2:
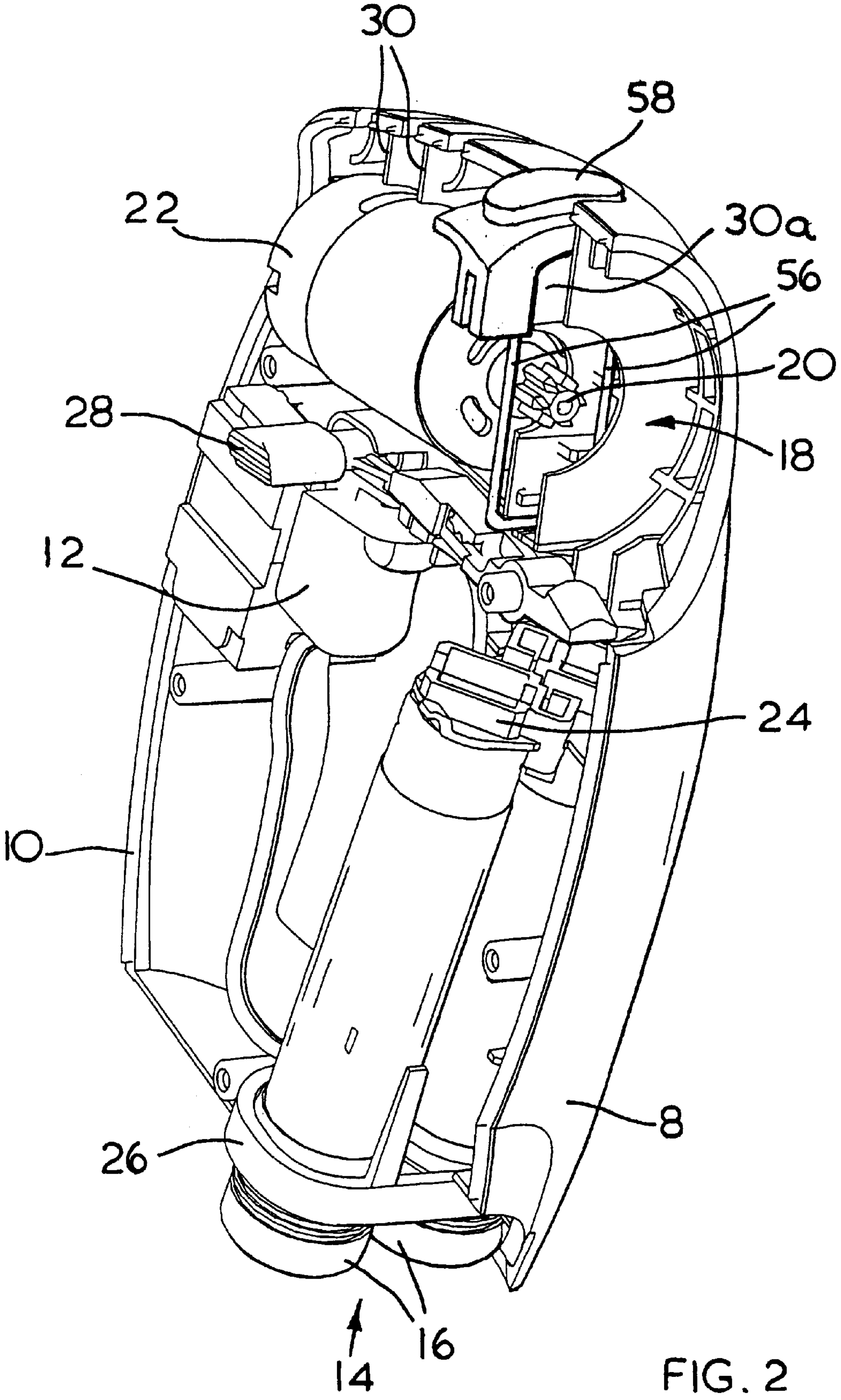
FIG. 2 shows a part cut-away view of the body portion of FIG. 1.
Figure 3:
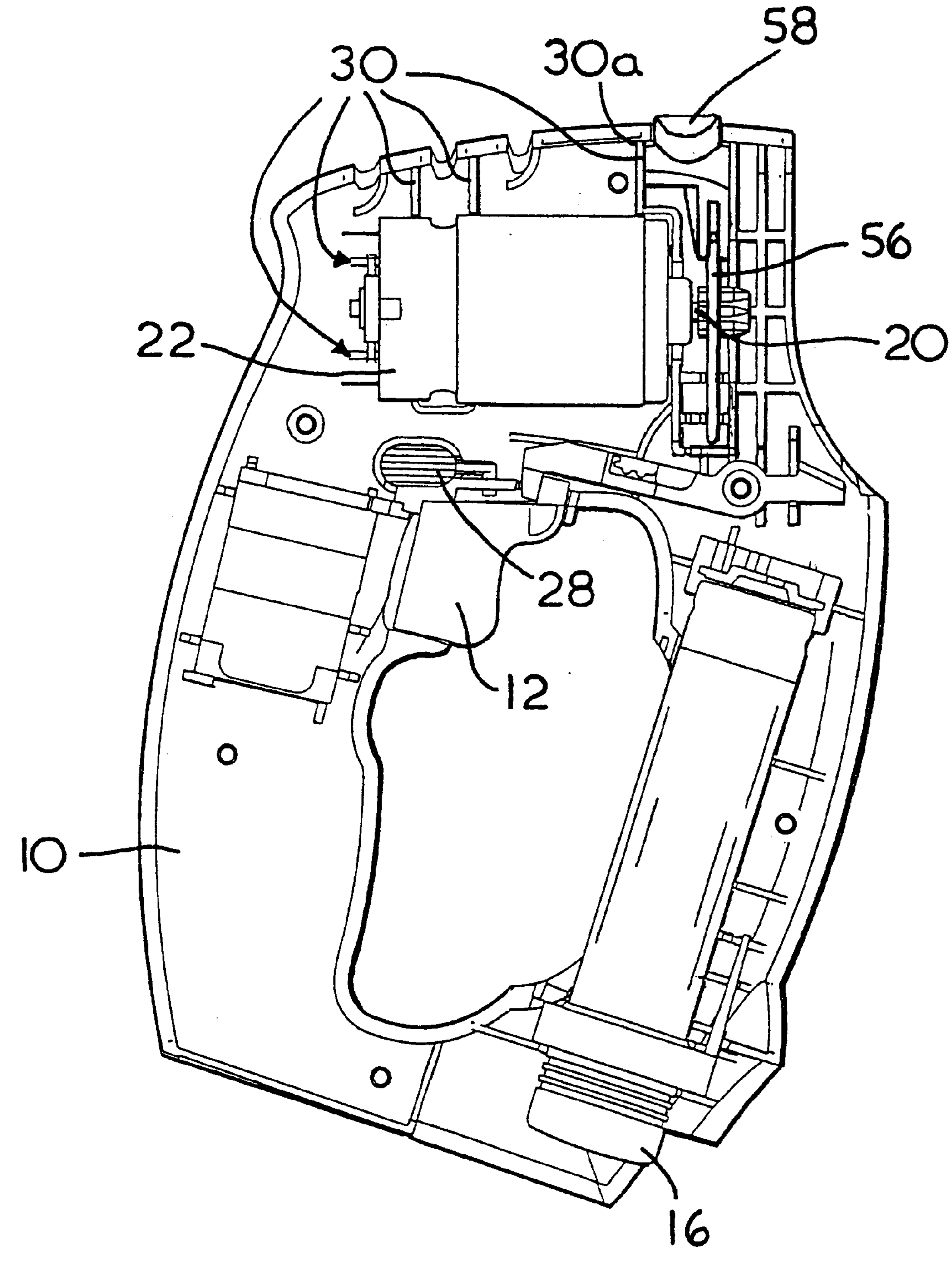
FIG. 3 shows a side part-sectioned view of the body portion of FIG. 1 without an attachment member presented thereto.

In FIG. 2 it will be understood that the half clamshell (6) has been removed for clarity. It can be seen that through the battery opening (14) a pair of batteries (16) have been passed and are electrically coupled via terminals (24) and switch means (12) to the motor (22). The batteries (16) are retained within their opening (14) by a detent mechanism (26) which can be manually operated in order to allow the removal of the batteries (16) from the body portion (4).

The motor (22) is selectively coupled to the batteries (16) via the switch means (12) in conventional manner. On activation of the switch means (12) the user selectively couples the motor (22) to the battery (16) thereby energizing the motor (22) which in turn provides a rotational force upon the output spindle (20). In example shown the output spindle (20) has connected thereto a cog for reasons which will become apparent hereinafter.

As is conventional in the art of power tools the motor (22) is provided with a forward/reverse switch (28) the operation of which determines the sense of rotation of the output spindle (20).

Whilst remembering of course that the half clamshell (6) is not shown in FIG. 2, although the motor (22) is mounted within the body portion (4), a plurality of ribs (30) actually provide support to the motor (22) within the body portion (4). The ribs (30) can be seen more clearly from FIGS. 2 and 3. It is important to note that in the example shown in these figures, the foremost rib (labeled 30(*a*)) does not actually contact the motor (22) itself, but stops slightly short thereof.

It will be apparent that due to the foremost rib (30(*a*)) not directly contacting the motor (22) itself, therefore the motor (22) has a slight degree of movement within its mounting position provided by the plurality of ribs (30). It will also be apparent to those skilled in the art that any one or ones of the combination of the plurality of ribs (30) may stop short of directly contacting the motor (22). The direct contact between the ribs (30) and the motor (22), when it does occur, needs to be rigid thereby to provide a good degree of support to prevent the motor (22) moving at this point of contact. Where the rib (30 (*a*)) is deliberately designed to stop short of and therefore not form any direct or rigid contact with the motor (22), then this permits for movement of the motor (22) relative to the rib (30).

Figure 5:
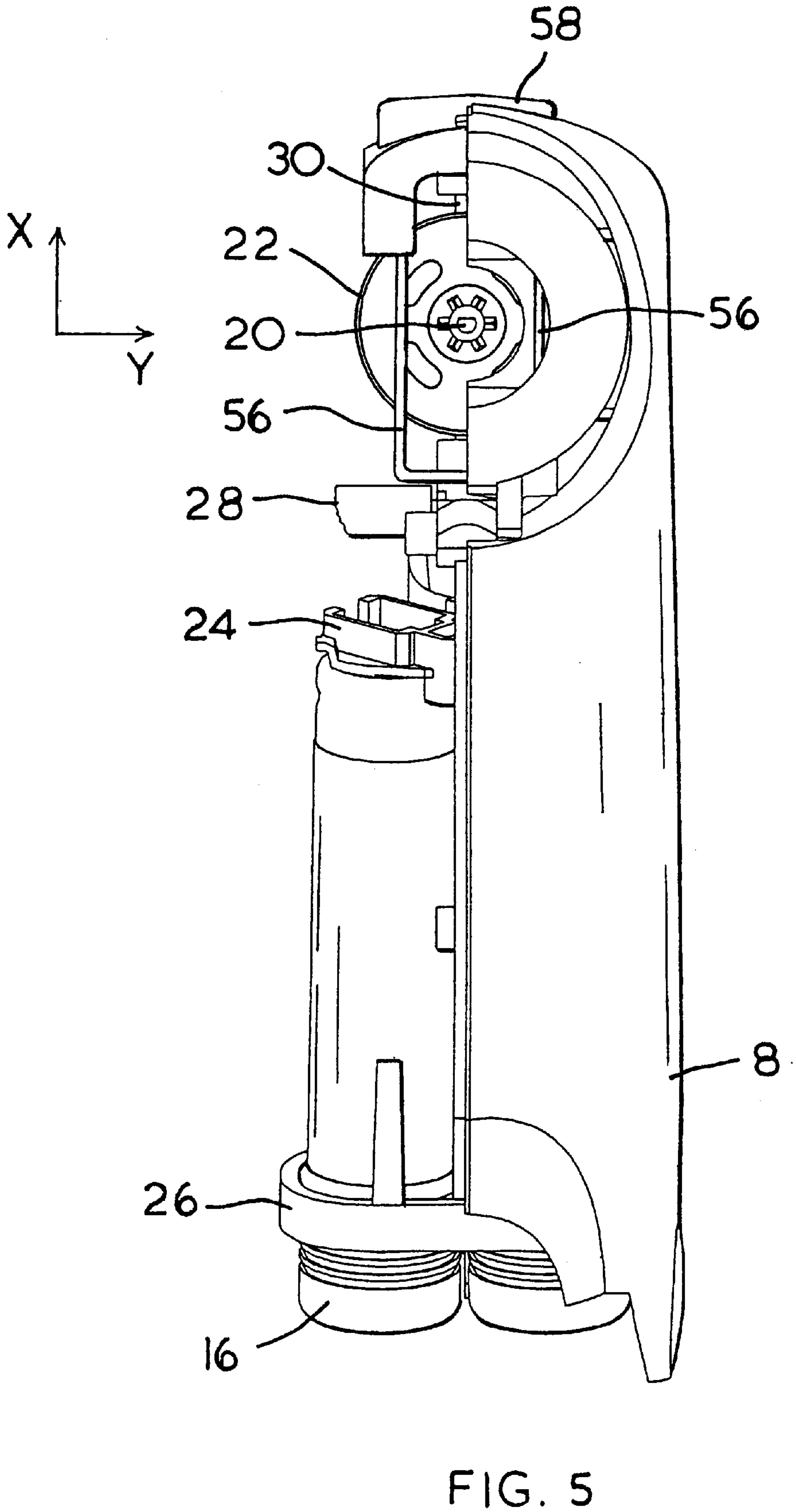
FIG. 5 shows an end-on part cut-away view of FIG. 4.

Because in the example shown the foremost rib (30 (*a*)) allows a small degree of movement of the motor (22) adjacent thereto, it will be apparent that the output spindle (20) will thus have a slight degree of movement or "play". This degree of "play" occurs in a plane defined by an orthogonal set of axis (conventionally termed x-y). The x-y axis within which the spindle (20) is free to have a limited degree of movement is shown more clearly in FIG. 5.

Figure 4:
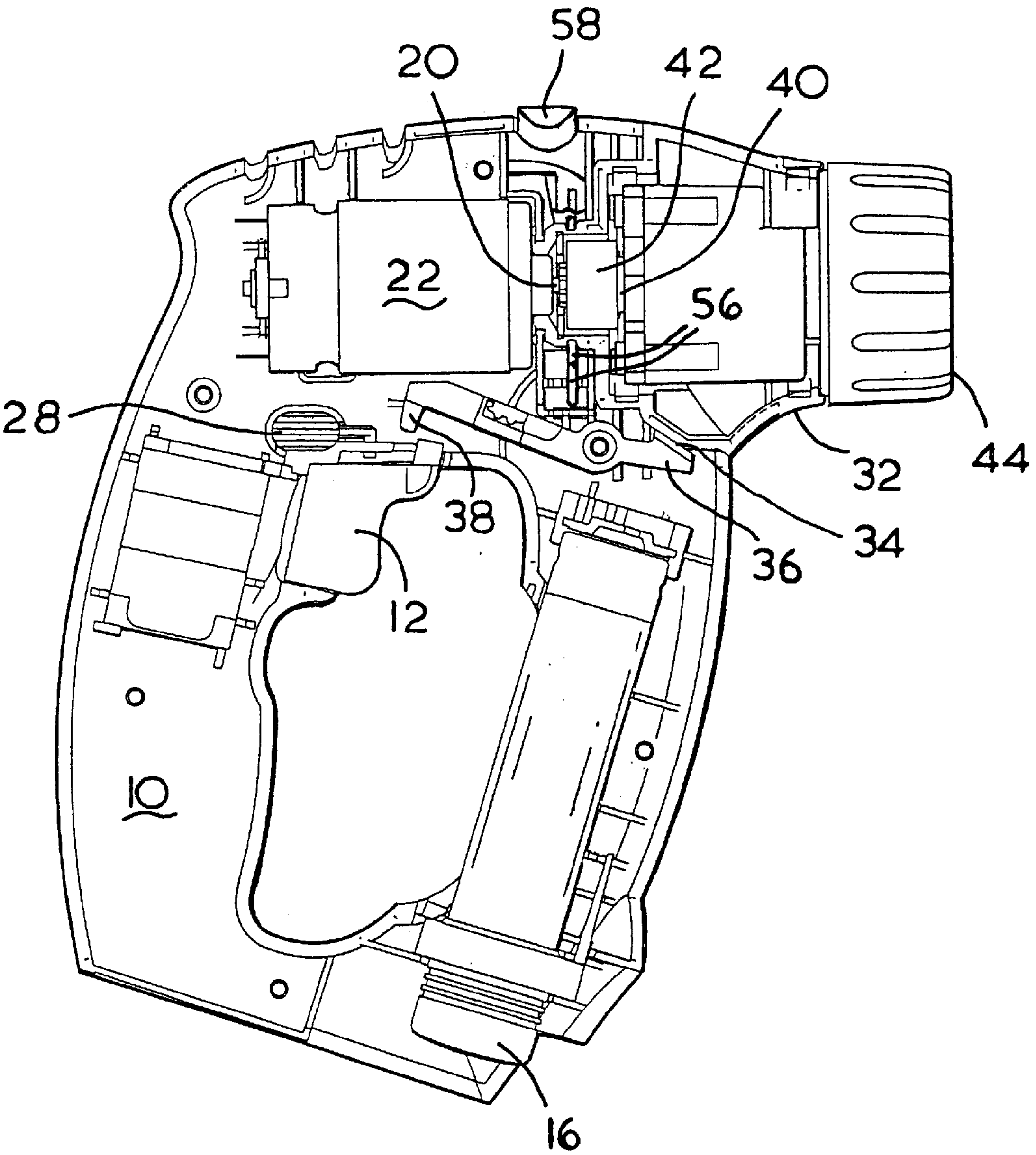
FIG. 4 shows a side part-sectioned view of the body portion of FIG. 1 with an attachment member presented thereto.

Referring now particularly to FIG. 4 in addition to other FIGS. 1 to 3 and 5, it can be seen that a power tool (2) has had presented thereto an attachment member (32), in this example a drill/driver for driving a drill bit. It can be seen that the drill/driver mechanism (32) is presented to the body portion (4) at the opening (18) for the output spindle (20). The outer periphery of the drill/driver mechanism (32) is shaped so as to fit snugly within the opening and mate with the outer periphery of the body portion (4). As the drill/driver mechanism (32) is brought into position an angled edge (34) thereof abuts against a pivotally movable release mechanism (36). When this occurs the right-hand side of the pivotal release mechanism (36) moves down as one views FIG. 4, and the left-hand side moves up thereby allowing the projecting peg (38) to be removed from its previously biased position wherein it held the switch means (12) permanently open. This provides a form of safety release mechanism which prevents accidental actuation of the switch means (12) until such times as the attachment member, or, as in this example, the drill/driver mechanism (32) is in position.

The drill/driver mechanism (32) has a drive spindle (40) to which is coupled at its end a female cog member (42) which is designed to engage with the male cog on the output spindle (20) of the motor (22). It will be appreciated that when the male and female cogs of the output spindle (20) and the drive spindle (40) mate together, then actuation of the motor (22) will cause simultaneous rotation of the output spindle (20) and the drive spindle (40) thereby rotating the head (44) of the drill/driver mechanism (32).

It is the presentation of the drill/driver mechanism (32) to the opening (18) of the body portion (4) which requires a more detailed description of the movement of the motor (22) within its plurality of mounted ribs (30). As the motor (22) is free to pivot slightly about its rear mounting portion defined by those of the plurality of ribs (30) which sit in rigid direct contact with the motor, this therefore allows an automatic alignment to occur between the axis of rotation of the motor spindle (20) and the axis of rotation of the drive spindle (40). If this were not the case, i.e. if the motor were not free to move slightly, then on presentation of the drill/driver mechanism (32) to the opening (18), there will be no guarantee of an accurate axial alignment of both the motor (22) and its output spindle (20) for the drill/driver mechanism (32) and its drive spindle (40).

By referring then also to FIGS. 6(*a*) and 6(*b*) the method of attachment of the drill/driver mechanism (32) to the body portion (4) will now be described. Those skilled in the art will appreciate that whilst in this example a drill/driver mechanism (32) is described as an attachment member, any suitable power tool means may be employed as an alternative. For example, instead of a drill/driver mechanism (32)

a sander or a jigsaw could form the attachment member. As, however the choice of attachment purpose is not relevant to the present invention no further reference thereto will be made herein.

Figure 6A:
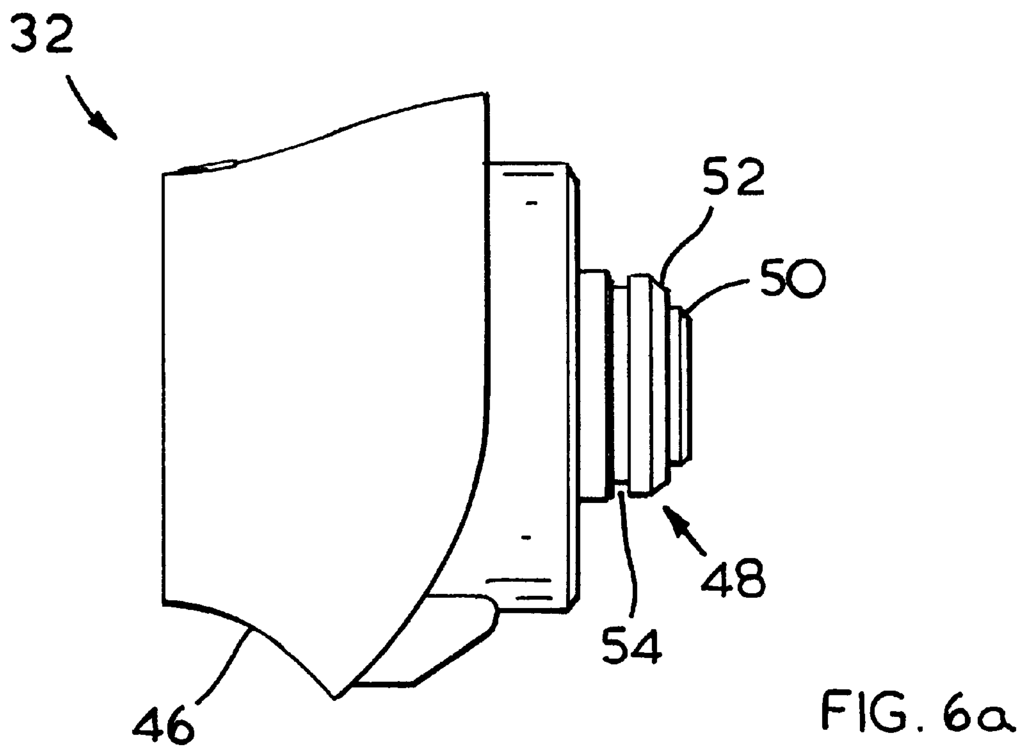
FIGS. 6(*a*) and 6(*b*) show respectively a view of an attachment member in accordance with the present invention which has been laterally sectioned from above and then also from above, but with the member having been turned upside down.
Figure 6B:
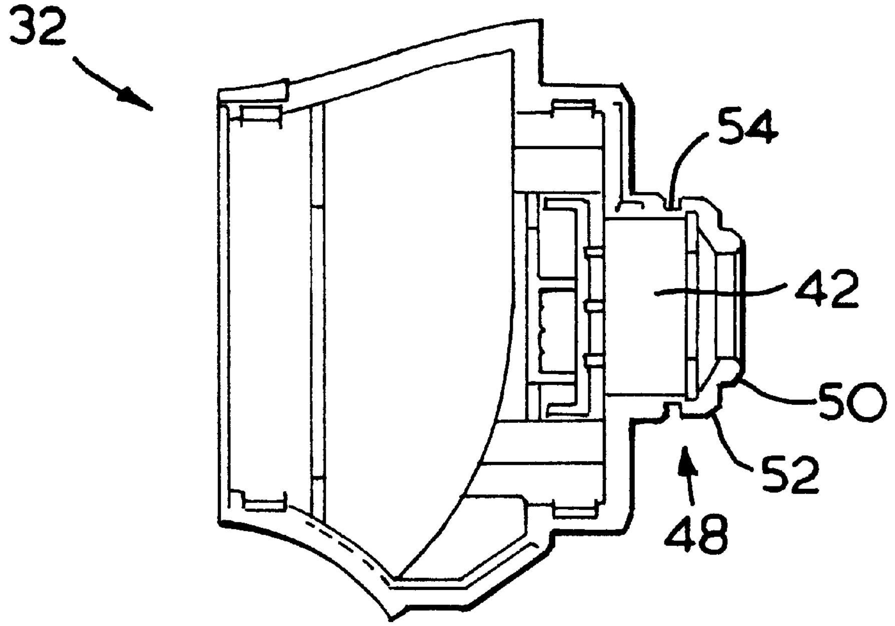
Figure 7A:
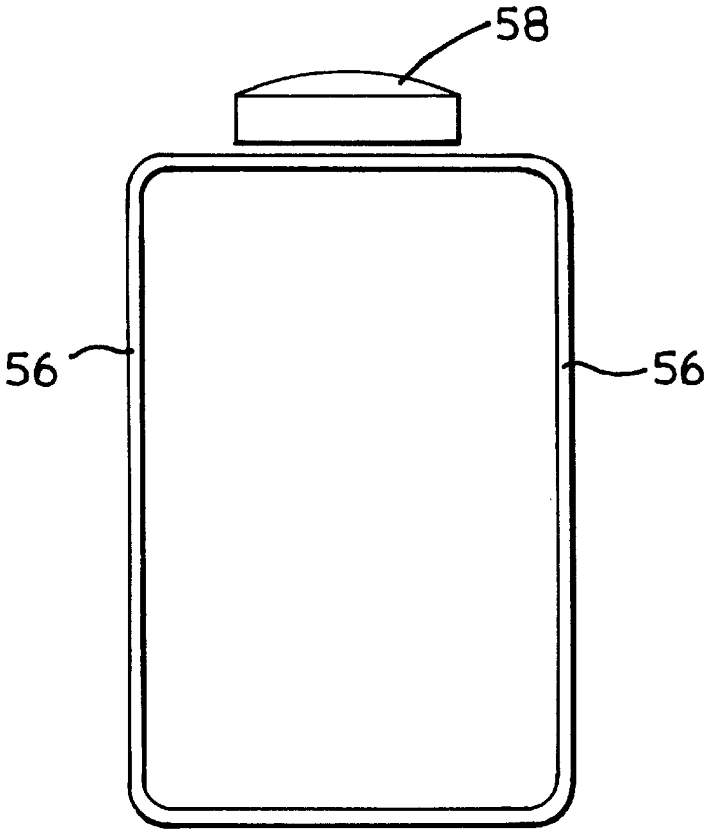
FIGS. 7(*a*) and 7(*b*) are simplified representations illustrating the biased arms operatively associated with the button, FIG. 7(*a*) illustrated with the button displaced from the arms and the arms biased to a rest position, FIG. 7(*b*) illustrated with the button causing the arms to splay apart.
Figure 7B:
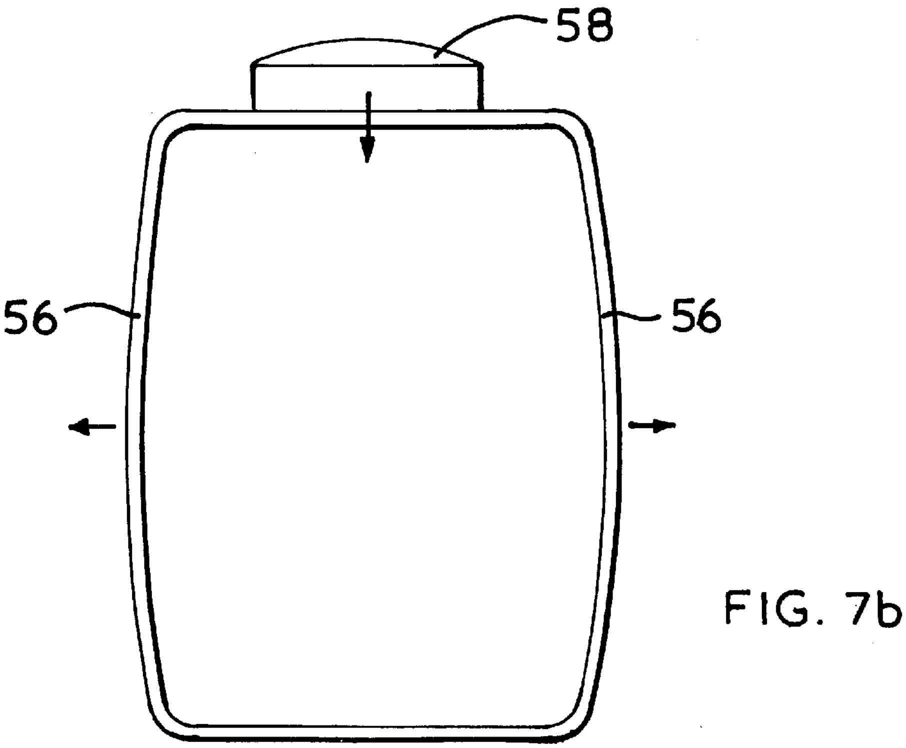

As can be seen from FIG. 6(*a*) the drill/driver mechanism (32) includes a main member (46) which has there within the functional mechanism for taking the rotary output of the spindle (20) and turning that into a geared rotary output for the drill/driver mechanism. It is the right hand end of the drill/driver mechanism (32) as viewed from FIG. 6 which is presented to the opening (18) of the body portion (4). The drill/driver mechanism (32) has at this end a co-operable second engagement means which in this example is a spigot (48). This spigot (48) is formed so as to have two tapered annular rings (50,52) at the foremost portion thereof The purpose of these tapered annular rings (50,52) will be described here below. The co-operable second engagement means also defines an annular recess (54) for co-operation with a first engagement means which is formed from the body portion (4) within the opening (18). In this example the first engagement means comprises a plurality of biased arms (56) which are shown more clearly in FIGS. 2, 3 and 4. The biased arms are, in this example, spring biased by means of their shape into a rest position which is at least no wider than the maximum diameter of the annular recess (54). The rest position is shown most clearly in the simplified view of FIG 7(*a*).

When the user wishes to insert the drill/driver mechanism (32) into the opening (18) and thereby to engage it with the body portion (4) so that the rotation of spindle (20) will cause simultaneous rotation of the female member (42) of the drill/driver mechanism (32) the following procedure is carried out: The user presents the spigot (48) into the opening (18) such that in addition to the operation described above with reference to the tapered edge (34) and pivotal release mechanism (36), the tapered annular rings (50,52) will force apart the arms (56) because as can be seen, particularly from FIG. 6(*a*) given that the separation of the arms (56) is no greater than the diameter of the annular recess (54) then clearly the tapered edges will splay or force apart the arms (56). Continued insertion of the mechanism (32) into the opening (18) will cause the arms (56) to snap-fit into place within the recess (54) when aligned therewith due to their spring biasing. In this manner therefore the user will hear a "click" when the snap-fit connection is in place and will therefore know that the entire tool is now ready for use. Furthermore, if for any reason the user attempts to pull the drill/driver mechanism (32) from the body portion (4) this will not be possible due to the engagement between the arms (56) and the annular recess (54).

When the user wishes to remove or change the drill/driver mechanism (32) the operation requires depressing of a manually operable release member, in this example a button (58), whose depression causes the arms (56) to splay apart. This is most clearly shown in the simplified view of FIG. 7(*b*). The user must ensure that sufficient force is applied to depress the button (58) by sufficient amount to enable splaying of the arms (56) apart by an amount sufficient to clear the annular recess (54) and also the annular ring upon which particularly the tapered ring (52) is formed. Once this has occurred the user may simply then pull or withdraw the drill/driver mechanism (32) from the opening (18).

Thus by the above operation the user is able to selectively engage the body portion (4) with the drill/driver mechanism (32).

Although in the FIGS. 6(*a*) and 6(*b*) the chuck mechanism itself is not described in any detail it would be apparent to those skilled in the art that the chuck head (44) will form part of this mechanism but has not been shown for the reasons of clarity.

It will be apparent that the motor (22) is formed in circular cross-section this is chosen as being advantageous for allowing the ribs (30) of the plurality thereof to be shaped so as to accommodate the motor (22) more easily. There is no necessity for the motor (22) to have a circular cross-section or indeed the drill/driver mechanism (32) or their respective spindles (20,40).

The ribs (30) of the plurality thereof have been formed from the plastics material of the clamshell halves (6,8). If desired the ribs (30) could be formed from separate members such as metal or other plastics members glued or otherwise stuck to the clamshell halves (6,8).

Those skilled in the art will appreciate that whilst in the above example a battery powered tool has been described there is no necessity for this to be the case. The advantages of the present invention are equally efficacious with corded or so called mains powered tools as well as battery operated.

What is claimed is:

1. A power tool comprising:

a tool body having a housing and a motor mounted in said housing, said motor including a rotary output;

a removable tool head; and a retention mechanism for releasably securing said removable head to said tool housing, said retention mechanism including first and second arms, said first and second arms movable between a first position and a second position such that in said first position said first and second arms are oriented substantially parallel to one another and define an opening having a first dimension for retaining a portion of said tool head and in said second position said opening defined between said first and second arms has a second, larger dimension for receiving and removing said portion of said removable tool head from said tool housing, wherein the tool body defines an aperture providing access to the rotary output and further wherein the first and second arms are disposed within the aperture and the rotary output is disposed between the first and second arms.

2. The power tool of claim 1, wherein said first and second arms are normally biased to said first position.

3. The power tool of claim 1, wherein the tool body includes a plate member defining a circular opening providing access to the rotary output and the tool head includes a generally cylindrical portion having an outer diameter substantially equal to an inner diameter of the circular opening, the cylindrical portion received within said circular opening when said tool head is releasably attached to said tool housing.

4. The power tool of claim 3, wherein said first and second arms are located behind said plate member.

5. The power tool of claim 1, wherein said tool body further includes a manually operated button for moving said first and second arms between said first and second positions, said button movable in a direction substantially parallel to said first and second arms when said first and second arms are in said first position.

6. The power tool of claim 1, wherein said tool head includes a cylindrical extension having a circumferential groove, said circumferential groove receiving said first and second arms when said tool head is attached to said tool body.

7. The power tool of claim 1, wherein said cylindrical extension has a diameter greater than said first dimension.

8. The power tool of claim 1, wherein said tool head includes a drive mechanism, said drive mechanism including an input member disposed within said cylindrical extension for rotatably coupling with said rotary output.

9. The power tool of claim 1, wherein the portion of the removable tool head comprises a spigot.

10. The power tool of claim 9, wherein the retention mechanism defines a generally rectangular, closed configuration.

11. The power tool of claim 9, wherein the first and second arms are part of a continuous element with a closed configuration.

12. The power tool of claim 9, wherein introduction of the spigot between the pair of arms enlarges the opening from the first dimension to the second dimension.

13. The power tool of claim 12, wherein the spigot defines a spigot opening for receiving the rotary output.

14. A power tool comprising:

at least one attachment member; and a body portion having a housing defining a handle and a motor mounted within the housing, the motor arranged to drive an output spindle of the tool, the body portion further defining an opening around the output spindle which opening accepts the at least one attachment member, the body portion including an engagement means within the opening and selectively engageable with a spigot formed on the attachment member, the engagement means movable between a first position to couple with the spigot and a second engagement position uncoupled from the spigot, the spigot defining an annular recess selectively cooperable with the engagement means to hold the at least one attachment member in engagement with the body portion, wherein the engagement means is normally biased to said first position to provide an opening of a first dimension to selectively retain the at least one attachment member one attachment member in engagement with the body portion.

15. The power tool of claim 14, wherein the annular recess is selectively cooperable with the first engagement means to hold the at least one attachment member in non-movable, non-rotational engagement with the body portion.

16. The power tool of claim 14, wherein the engagement means defines an opening a second, larger dimension for receiving the spigot within the opening.

17. The power tool of claim 16, wherein the first engagement means includes a manually operable release member for enlarging the opening from the first dimension to the second dimension.

18. The power tool of claim 14, wherein the engagement means includes a plurality of arms.

19. The power tool of claim 14, wherein the spigot includes a tapered leading edge.

20. The power tool of claim 14, wherein said engagement means includes a pair of arms which are normally substantially parallel and define the first dimension.

21. The power tool of claim 20, wherein introduction of the spigot between the pair of arms enlarges the opening from the first dimension to the second dimension.

22. The power tool of claim 20, wherein the output spindle is disposed between the pair of arms.

23. The power tool of claim 22, wherein the spigot defines a spigot opening for receiving the output spindle.

24. The power tool of claim 14, wherein said engagement means defines a generally rectangular, closed configuration.

* * * * *